United States Patent
Snauwaert (10) Patent No.: US 8,018,878 B2
(45) Date of Patent: Sep. 13, 2011

(54) METHOD AND DEVICE TO TRANSMIT A BUSY MEDIUM SIGNAL TO ANOTHER DEVICE

(75) Inventor: Filip Snauwaert, Koekelare (BE)

(73) Assignee: Thomson Licensing, Boulogne-Billancourt (FR)

( * ) Notice: Subject to any disclaimer, the term of this patent is extended or adjusted under 35 U.S.C. 154(b) by 406 days.

(21) Appl. No.: 12/223,880

(22) PCT Filed: Feb. 9, 2007

(86) PCT No.: PCT/EP2007/051237
§ 371 (c)(1),
(2), (4) Date: Aug. 12, 2008

(87) PCT Pub. No.: WO2007/096254
PCT Pub. Date: Aug. 30, 2007

(65) Prior Publication Data
US 2010/0316100 A1   Dec. 16, 2010

(30) Foreign Application Priority Data
Feb. 20, 2006 (EP) .................................... 06447024

(51) Int. Cl.
*H04B 1/56* (2006.01)
*H04L 5/14* (2006.01)
*H04J 3/16* (2006.01)
*H04J 3/22* (2006.01)

(52) U.S. Cl. ....................... 370/276; 370/465

(58) Field of Classification Search .................. None
See application file for complete search history.

(56) References Cited

U.S. PATENT DOCUMENTS

| 5,905,870 | A * | 5/1999 | Mangin et al. .............. 709/234 |
| 6,704,280 | B1 | 3/2004 | Mangin et al. |
| 2004/0085910 | A1 * | 5/2004 | Wang .......................... 370/252 |
| 2005/0041595 | A1 * | 2/2005 | Uzun et al. .................. 370/252 |

OTHER PUBLICATIONS

D. Heirman et al: "Part 3: Carrier sense multiple access with collision detection (CSMA/CD) access method and physical layer specifications", IEEE Standard 802.3; [On Line], Mar. 8, 2002, XP002379253.
Search Report Dated Mar. 23, 2007.

* cited by examiner

*Primary Examiner* — Xavier Szewai Wong
(74) *Attorney, Agent, or Firm* — Robert D. Shedd; Jeffrey M. Navon (57) ABSTRACT

The present invention concerns a device comprising a medium access control module for performing functions of a medium access control sublayer, noted MAC module, the device comprising a MAC interface module connected to the MAC module, the MAC interface module being adapted to connect in a first mode with a connector to a second MAC interface module or in a second mode with a connector to a physical interface module, the second MAC interface module being located in a second device comprising a MAC module connected to the second MAC interface module. In the first mode, the device comprises means for communicating in a half-duplex manner with the second device, and means for sending a medium busy signal to the second device.

7 Claims, 8 Drawing Sheets

METHOD AND DEVICE TO TRANSMIT A BUSY MEDIUM SIGNAL TO ANOTHER DEVICE

This application claims the benefit, under 35 U.S.C. §365 of International Application PCT/EP2007/051237, filed Feb. 9, 2007, which was published in accordance with PCT Article 21(2) on Aug. 30, 2007 in English and which claims the benefit of European patent application No. 06447024.8, filed Feb. 20, 2006.

The present invention relates to a method and a device for controlling data flow between the device and a second device communicating on a common transmission medium in a half-duplex manner.

The media independent interface, noted MII interface, intends to connect an Ethernet Medium Access Control (MAC) layer to an Ethernet Physical layer. It is capable of supporting the transfer of data rates of 10 Mbit/s and 100 Mbit/s. The MII interface comprises a management interface to manage the Ethernet Physical layer. The MII interface standard is described in clause 22 and Annex 22A of the IEEE Standard 802.3-2002 Edition, dated 8 Mar. 2002, referred hereafter as document (a). The Ethernet Physical layer handles the transfer of the data via the medium. The medium can be full or half duplex. In half duplex operation, when data is being transferred on the medium, the Ethernet Physical Layer indicates a busy medium, using the carrier sense mechanism. The MAC layer monitors the carrier sense mechanism to check whether the medium is free before transferring data. In full duplex operation the carrier sense mechanism is not used by the MAC layer.

The MII standard may be implemented within the form of a MAC MII module, a connector and a PHY MII module. As indicated in the MII standard, the implementation of the interface may assume any of the following forms: a chip-to-chip interface implemented with traces on a printed circuit board, a motherboard to daughterboard interface between two or more printed circuit boards, or an interface between two printed circuit assemblies that are attached with a cable and a connector. For example, a chipset implementing an Ethernet MAC layer may be connected to a chipset implementing an Ethernet Physical layer, according to the MII standard, with traces on a printed circuit board.

The MII interface may also be used to connect an Ethernet Medium Access Control to another Ethernet Medium Access Control. Then, a chipset implementing an Ethernet MAC layer may be connected to a chipset implementing an Ethernet MAC layer, according to the MII standard, with traces on a printed circuit board. The MII interface comprises then a MAC MII module, a connector and another MAC MII module. The connection between the MAC MII modules bypasses the PHY MII modules, and bypasses the Ethernet physical layer.

The MAC layer defines a medium-independent facility built on the Physical layer. The carrier sense mechanism gives an input for the MAC layers based on the signals provided by the Physical layer. When the MAC layers are connected to each other, the carrier sense mechanism is strapped to inactive. The MAC layers must then work in full duplex mode, where the MAC layers ignore the carrier sense mechanism.

A flow control may be needed to reduce the bandwidth between a first device and a second device connected to the first device via the MII interface. This may be due to the fact that the bandwidth for the data transfer inside the first device is limited. The system RAM of the first device may also be limited in size: if for some reason the buffer is running full, frames can get lost. Using flow control, the second device can be stopped transmitting frames. As a result, the first device does not drop frames received from the second device because of buffer overflow in the System RAM or bandwidth limitation of the first device. Functionally the first device uses the buffer space of the second device.

A method of implementing back pressure in a full-duplex mode is described in the document (a), Section 22, 31 and 31A. It uses standardized MAC layer control packets that contain commands for the MAC layer. The control packet is generated and received by the MAC layer. When a device wants to back pressure the other device, it generates a control packet requesting the other device to pause transferring data. Another control frame is sent to indicate that the other device can resume transmitting packets. The disadvantage of this method is the response latency for the second device that leads to the first device requiring extra buffer space and a buffer management system to be able to store extra data packets.

The present invention concerns device comprising a medium access control module, noted MAC module, for performing functions of a MAC sublayer, the MAC module being adapted to connect, in a MAC-to-MAC mode, to a second MAC module through a physical link that is not using a carrier sense mechanism, or/and to connect, in a MAC-to-PHY mode, to a physical module.

According to the invention, the device comprises means for communicating in a half-duplex manner with the second MAC module in the MAC-to-MAC mode, and means for sending a medium busy signal to the second MAC module in the half-duplex mode.

Surprisingly, the medium access control module of the first device communicates in a half duplex manner with the medium access control module of the second device. The first device sends a medium busy signal to indicate that the medium is busy and the second device can not send data to the medium.

According to an embodiment, the device comprises means for indicating a busy medium duration to the second MAC module.

The device indicates a duration in the medium busy signal during which the second device is not allowed to send any data. At the end of the duration, the second device is allowed to resume sending of data to the first device.

According to an embodiment, the device comprises means for receiving data from the second MAC module up to a maximum data rate, and means for sending a busy medium signal to the second MAC module on a reception of data at a data rate higher than the maximum data rate.

Advantageously, the device comprises means for sending data to the second MAC module during the duration.

The first device sets a duration to prevent the second device from sending data and it can send data to the second device during the duration.

According to an embodiment, the MAC module is adapted to connect to the second MAC module or/and to said physical module through a media independent interface, and the busy medium signal is a carrier sense signal.

According to an embodiment, the MAC module comprises means for selecting between the MAC-to-MAC mode and the MAC-to-PHY mode.

The invention also concerns an Integrated circuit implementing the means of the device of the invention.

The invention also concerns a method, in a device, for controlling data flow between a medium access control module of the device, noted MAC module, communicating in a half-duplex manner to a second MAC module, the MAC module being adapted to connect, in a MAC-to-MAC mode, to the second MAC module through a physical link that is not using a carrier sense mechanism.

The method of the invention comprises the steps of sending a busy medium signal from the first device to the second MAC module, the busy medium signal indicating a duration and suspending data transmission by the second MAC module to the first device during the duration.

The method also comprises the step of indicating a busy medium by the first device to the second MAC module on reception of data from the second MAC module at a data rate higher than a maximum data rate.

Another aspect of the invention is a computer program product comprising program code instructions for executing the steps of the process according to the invention, when that program is executed on a computer. By "computer program product", it is meant a computer program support, which may consist not only in a storing space containing the program, such as a diskette or a cassette, but also in a signal, such as an electrical or optical signal.

The invention will be better understood and illustrated by means of the following embodiment and execution examples, in no way restrictive, with reference to the appended figures among which.

Figure 1:
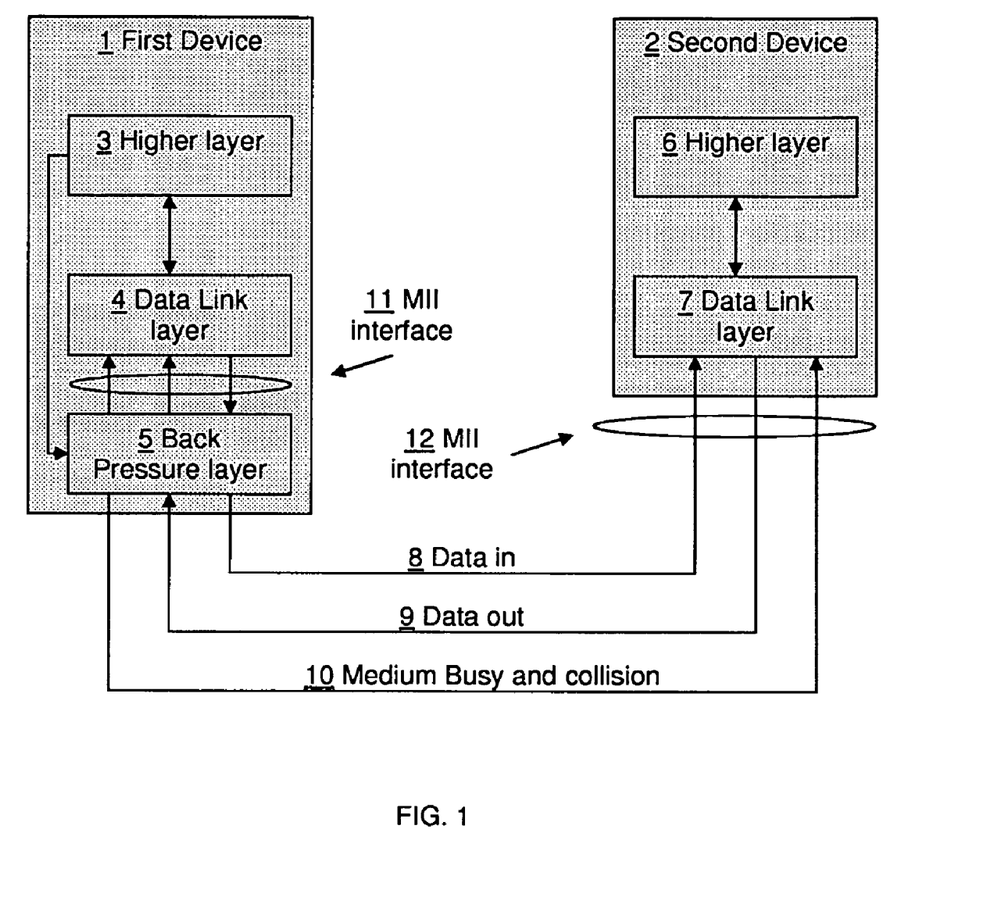
FIG. 1 indicates the layers that participate into the communication between a first device and a second device, with the types of signals.
Figure 2:
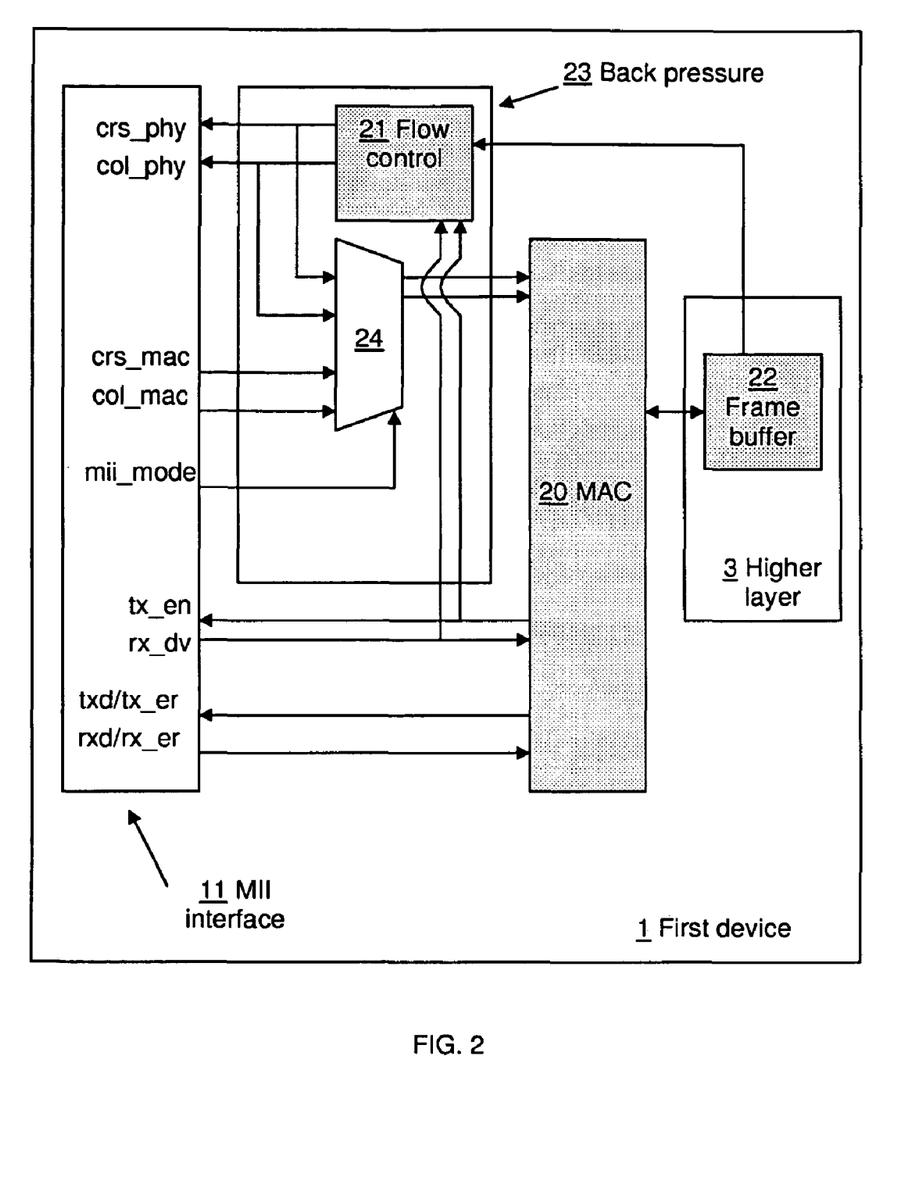
FIG. 2 is a schematic diagram showing an implementation of the flow control.
Figure 3:
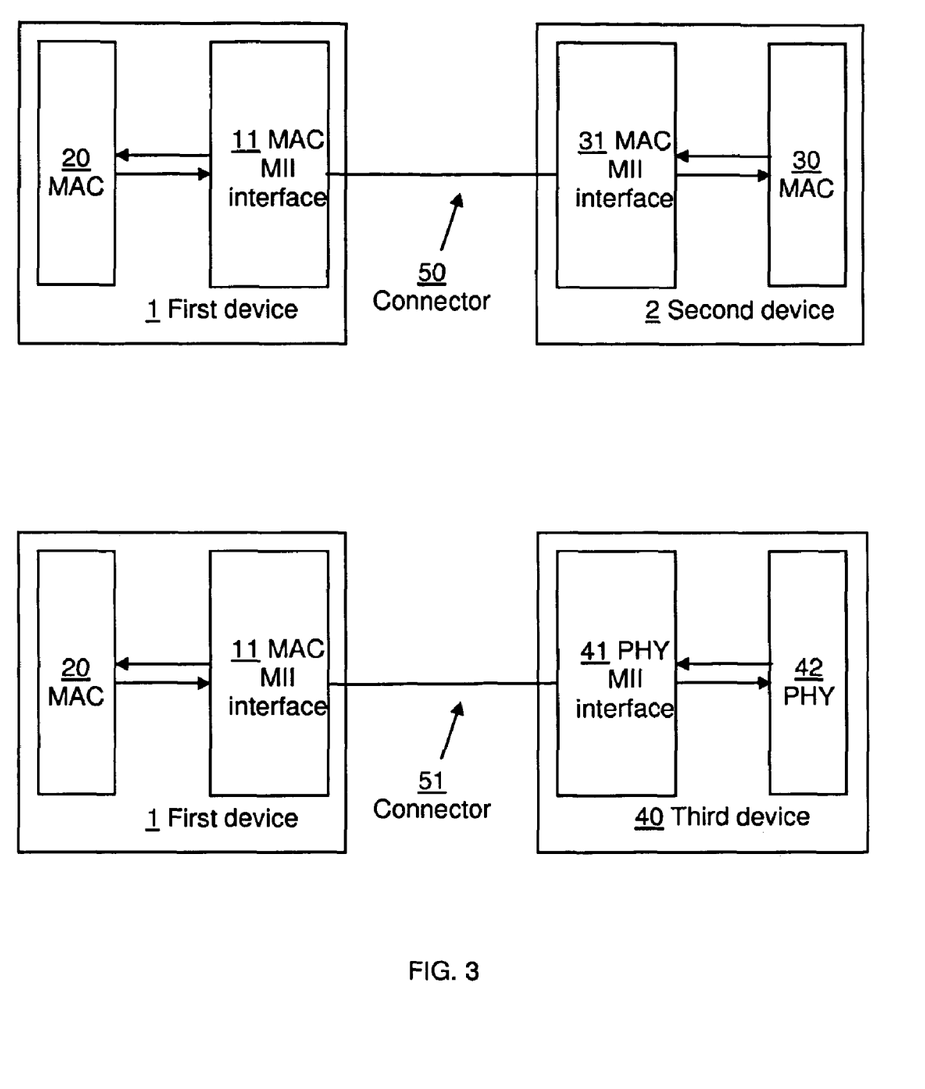
FIG. 3 shows a second device and a third device to which the first device may connect

In FIG. 1, FIG. 2 and FIG. 3, the represented blocks are purely functional entities, which do not necessarily correspond to physically separate entities. Namely, they could be developed in the form of software, or be implemented in one or several integrated circuits.

The exemplary embodiment comes within the framework of a media independent interface, noted MII, but the invention is not limited to this particular environment and may be applied within other types of interfaces.

FIG. 1 represents a first device 1 connected to a third party standard device, which is the second device 2.

The first device comprises a data link layer 4 with a media independent interface 11, noted MII, towards a back pressure layer 5. The data link layer 4 also comprises an interface to a higher layer 3.

The Data Link layer receives and transmits data packets. It adds error checking fields when transmitting packets. It checks the error checking fields when receiving data. The Data Link layer controls and monitors access to the transmission medium.

The Higher layer generates and receives the data packets. The Higher layer comprises buffering means. It may decide on when to back pressure the second device.

In an embodiment, the Data Link layer comprises buffering means and may also decide on when to back pressure the second device.

The second device comprises a data link layer 7 and a higher layer 6. The data link layer comprises a MII interface 12.

The first device and the second device are connected through the MII interface, the MII interface in the first device being modified with the back pressure layer. There is no Ethernet Physical layer between the devices. They are connected as indicated in FIG. 3.

The interface between the first and the second devices consists of the following:

Data In 8: data input and control signals, input for Data Link layer,

Data Out 9: data output and control signals from Data Link layer, and

Medium Busy and collision signal 10: input for Data Link layer. Medium busy signal corresponds to the carrier sense mechanism. Collision signal means that different devices are sending at the same time, which is an error condition in half-duplex systems.

The signals at the MII interface 11 of the first device 1 are represented in FIG. 2.

The FIG. 2 highlights the back pressure module 23 that performs the functions of the back pressure layer 5 of the FIG. 1, and the signals that form its interfaces to the MII interface 11 and the data link layer. The back pressure module 23 comprises a multiplexer 24 and a flow control module 21.

The FIG. 2 shows the medium access control module, noted

MAC 20, which performs the function of the Data Link layer 4 represented in the FIG. 1. It may be for example an Ethernet MAC.

The multiplexer 24 permits to connect the MAC 20 to the correct signal depending on the selected mode, as defined below.

The higher layer 3 comprises a frame buffer 22. The frame buffer 22 comprises an interface to the flow control module that permits to indicate to start or stop the back pressure mechanism.

The first device may connect to an Ethernet MAC module or an Ethernet PHY module via the MII interface. The first device behaves as:

An Ethernet PHY: referred to as MII PHY mode, also known as Reverse MII, or

An Ethernet MAC: referred to as MII MAC mode.

The FIG. 3 shows the second device and the third device to which the first device may connect.

The second device 2 comprises a MII interface 31 that is internally connected to a MAC module 30. The MII interface 31 is connected to the MII interface of the first device with a connector 50.

The third device 40 comprises a MII interface 41 that is internally connected to a PHY module 42. The MII interface 41 is connected to the MII interface of the first device with a connector 51.

The connector 50 and 51 are defined in the clause 22 of the document (a).

The MII_mode which is used to select between the Ethernet MAC mode and the Ethernet PHY mode is not indicated in the MII standard and is further described hereafter.

The following table indicates the MII signals of the first device.

| Name | Direction | Description |
|---|---|---|
| | | MII Data Interface |
| TX_CLK | In | Transmit clock |
| TXD[3:0] | Out | Transmit data |
| TX_EN | Out | Transmit enable |
| TX_ER | out | Transmit error |
| RX_CLK | in | Receive clock |
| RXD[3:0] | in | Receive data |
| RX_DV | in | Receive data valid |
| RX_ER | in | Receive error |
| CRS | in/out | Carrier Sense indication |
| COL | in/out | Collision indication |
| | | MII Management Interface |
| MDC | Out | Management data clock |
| MDIO | in/out | Management data input/output |
| | | MII Mode Selection |
| MII_Mode | In | Select MII MAC or MII PHY mode |

In the MII MAC mode, the first device is connected to an Ethernet PHY or any device behaving as an Ethernet PHY. In this mode, the MII interface of the Ethernet MAC in the first device is compliant with the MII timing requirements. The following table indicates how to connect the first device to a second device acting as an Ethernet PHY. The arrow indicates the direction of the signal.

| First device | | Second device |
|---|---|---|
| RX_CLK | ← | TX_CLK |
| TXD | → | TXD |
| TX_EN | → | TX_EN |
| TX_ER | → | TX_ER |
| TX_CLK | ← | RX_CLK |
| RXD | ← | RXD |
| RX_DV | ← | RX_DV |
| RX_ER | ← | RX_ER |
| COL | ← | COL |
| CRS | ← | CRS |
| MDC | → | MDC |
| MDIO | ↔ | MDIO |
| MII_Mode | ← 1 | |

The following table describes how to connect the first device to the second device with a MII interface. The operating mode is full or half duplex, 10 Mbit/s and 100 Mbit/s. The first device behaves as an Ethernet PHY to the second device. The carrier sense signal CRS and collision signal COL are generated by the first device and can be used for half duplex flow control. The following table indicates how to connect the data signals.

| First device | | Second device |
|---|---|---|
| TX_CLK | → | RX_CLK |
| TXD | → | RXD |
| TX_EN | → | RX_DV |
| TX_ER | → | RX_ER |
| RX_CLK | → | TX_CLK |
| RXD | ← | TXD |
| RX_DV | ← | TX_EN |
| RX_ER | ← | TX_ER |
| COL | → | COL |
| CRS | → | CRS |
| MDC | open | MDC |
| MDIO | open | MDIO |
| MII_Mode | ← 0 | |

The first device must be configurable via MII interface. After power-up, the first device must know in which mode it is working, MII MAC or MII PHY mode. This means that an extra pin is required to select the MAC mode: MII_Mode. The following table indicates the allowed values of the pin MII_Mode.

| Value | Description |
|---|---|
| '1' | MII MAC mode, standard MII interface of an Ethernet MAC |
| '0' | MII PHY mode, first device behaves as a full or half duplex Ethernet PHY |

The Flow control module 21 of the first device controls the CRS, COL and full duplex control signals of the MAC 20. The flow control is initiated when the buffer filling reaches a high threshold. The flow control is disabled when the buffer filling reaches a low threshold, which is set to a value lower than the high threshold.

Figure 4:
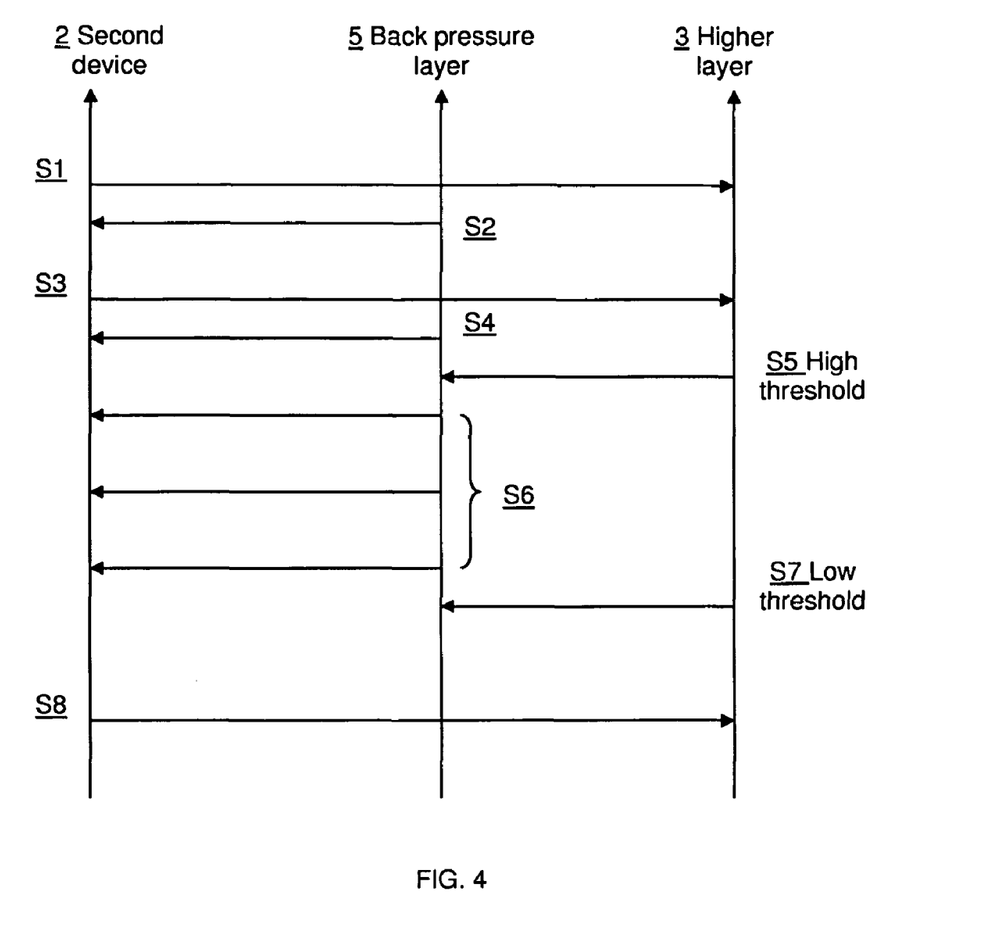
FIG. 4 is a flow chart illustrating the flow control mechanism.

The flow control mechanism is illustrated in FIG. 4. When half duplex flow control with Carrier Sense (CRS) is used, the first device is behaving as an Ethernet PHY to the second device. The first device generates the CRS and COL signals. The first device operates in MII PHY mode, also known as reverse MII.

When the second device starts transmitting data (S1, S3), the flow control module of the first device makes the CRS signal active (S2, S4). The data is received by the first device. It is first stored in the buffer 22 of the higher layer 3. The higher layer reads from the buffer at its own rate. The rate is lower than what the second device can deliver. The buffer starts filling as more data is written than read.

At a certain time, the buffer filling level reaches a high threshold (S5). When the high threshold in the frame buffer 22 is reached, the first device keeps the CRS signal active (S6). The higher layer indicates to the back pressure layer to keep the CRS signal active.

The second device is then not allowed to send a next frame until the CRS signal becomes inactive, as indicated in clause 4.2.3.2 and clause 4.2.8 of the document (a).

Meanwhile, the higher layer keeps on reading from the buffer 22. When the frame buffer 22 goes below the low threshold (S7), the CRS signal is de-asserted. The higher layer indicates to the back pressure layer to inactivate the CRS signal. The second device is allowed to immediately transmit data (S8) after the interframe gap, as indicated in clause 4.2.3.2 of the document (a).

When the high threshold in the system memory is reached, it is possible that the second device is transmitting data. The high threshold should allow the buffer to store the remainder of the frame.

Using the buffer filling levels is a method to perform the flow control. Other methods may be implemented depending on the implementation of the higher layer.

The Flow Control module generates the CRS signal for the MII interface when the MII interface is operating in half duplex mode. When flow control is started, the CRS signal is made active. When the second device receives the CRS signal it has to defer its own transfer.

in MII MAC mode, the signals crs_mac and col_mac are used to connect to an Ethernet PHY in MII PHY mode, the signals crs_phy and col_phy are used to connect to an Ethernet MAC The multiplexer 24 permits to connect to the right signal depending to the MII_Mode that is selected.

Figure 5:
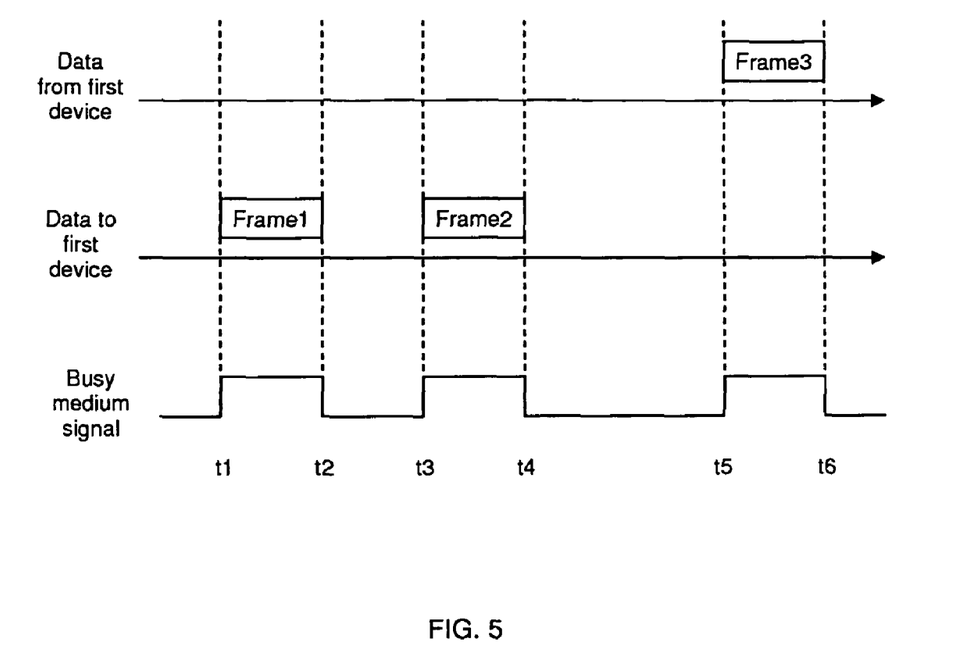
FIG. 5 is a flow chart indicating the carrier sense mechanism as used when data is transferred between a first and a second device.
Figure 6:
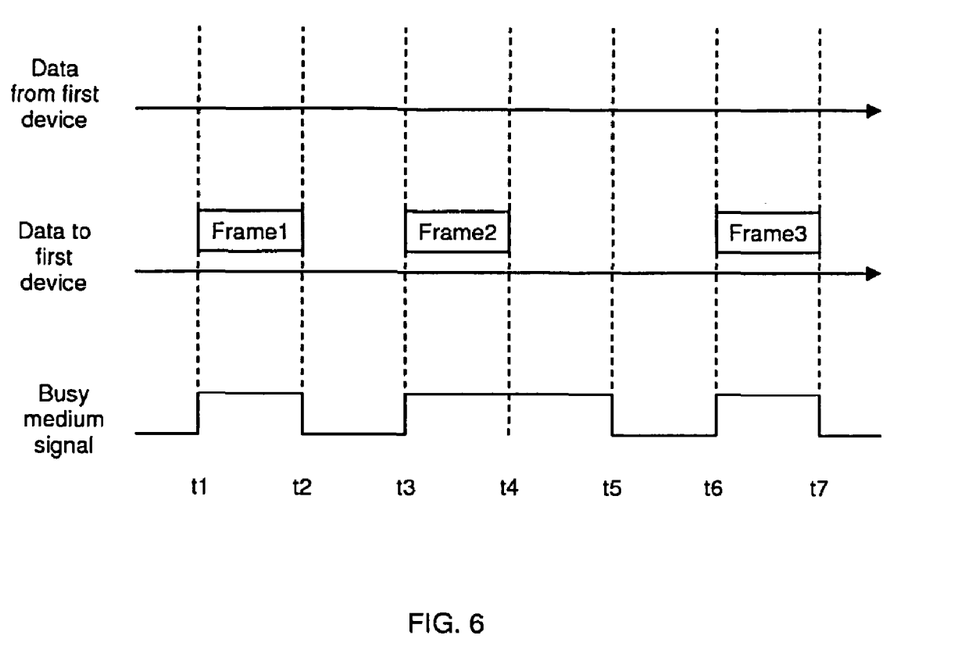
FIG. 6 is a flow chart indicating the carrier sense mechanism as used to suspend data transfer from the second device.
Figure 7:
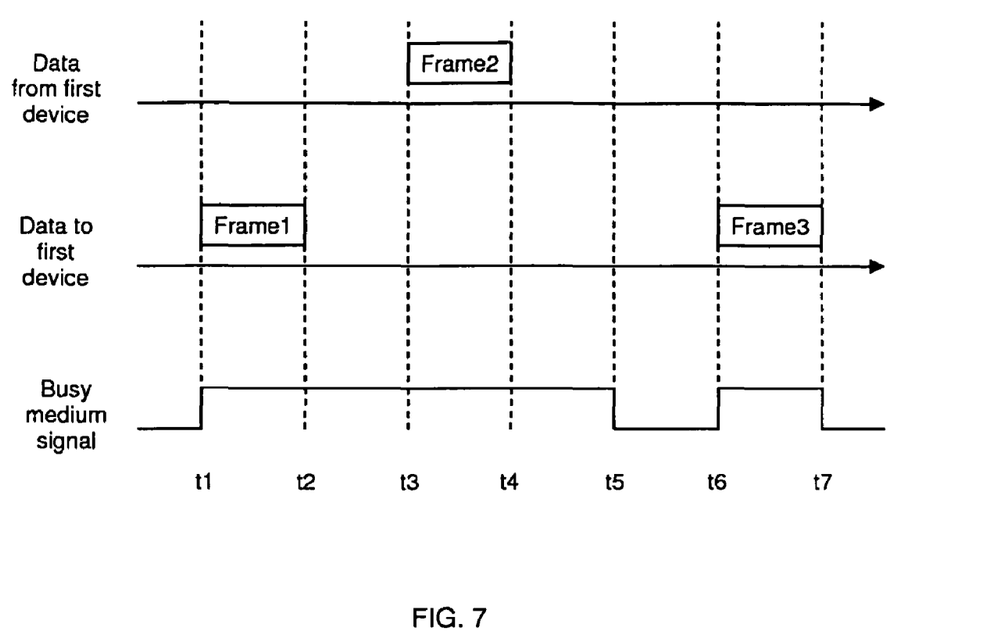
FIG. 7 is a flow chart indicating the carrier sense mechanism as used to suspend data transfer from the second device and allow data transfer from the first device.

The FIGS. 5 to 7 give examples of the back pressure mechanism.

FIG. 5 shows second device transferring data, frame1 and frame2 to the first device. The first device can handle the data rate. No back pressure is required. The first device makes CRS active each time the second device is transferring data, as required by the MII standard. The frame3 is sent by the first device to the second device.

In FIG. 6, the first device is receiving data frames from the second device. The frame1 is received between t1 and t2. The first device makes the CRS (Carrier Sense) signal active as long as data is received. The frame2 is received at t3. The first device back pressures the second device by keeping CRS active at t4. The second device can only send another frame, frame3, when CRS becomes inactive at t5.

FIG. 7 indicates that the first device can send data while back pressuring the second device. The second device sends frame1 to the first device at t1, and the first device back pressures the second device by keeping CRS until t5. In the meantime, the first device sends frame2 between t3 and t4 to the second device. After the back pressure period ends, the second device can send data, frame3, to the first device.

Figure 8:
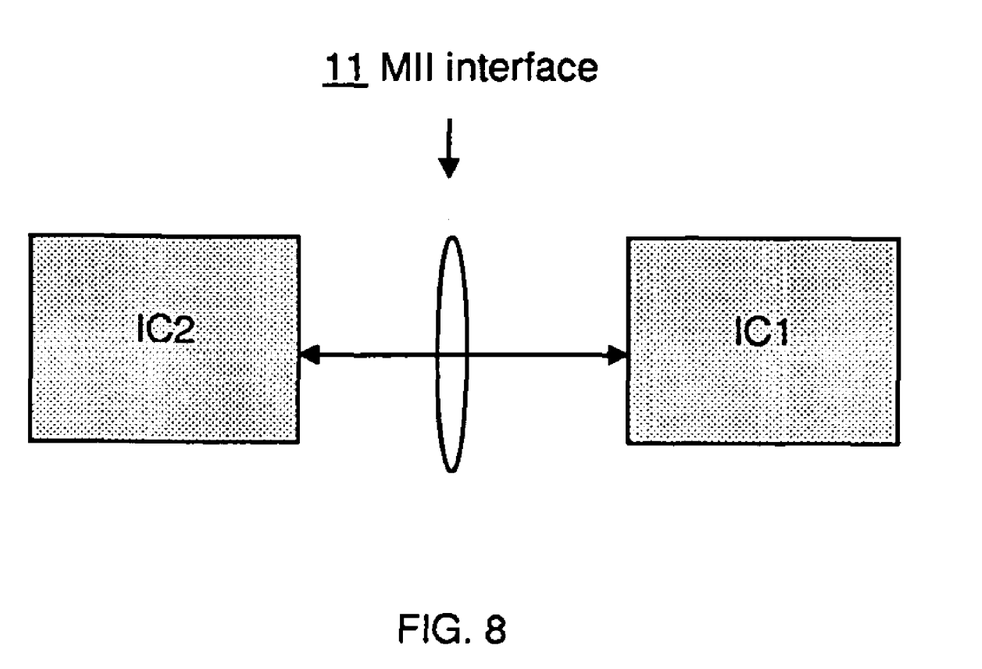
FIG. 8 shows an example of an implementation of the first device.

FIG. 8 shows an example of an implementation of the first device. It may be an Integrated Circuit, IC1 that is a Wireless LAN adapter, compliant with the IEEE 802.11 and Wi-Fi standards with a MII interface to connect to the second device that is an Integrated Circuit, IC2, such as a DSL host or Ethernet switch.

The Wi-Fi part can only handle up to 30 Mbps and the MII standard allows to transfer up to 100 Mbps in half duplex. If no back pressure mechanism were included, data would be lost if the second device connected would transfer data at a rate higher than the first device can handle.

The MII interface of the IC1 is connected to the MII interface of the IC2 with a connector being traces on a printed circuit board between IC1 and IC2.

The invention claimed is:

1. Device comprising:
   a Medium Access Control Media Independent Interface, noted MAC MII interface configured to connect said device, either to a second MAC MII interface of a second device, in a mode noted a MAC-to-MAC mode, or to a MII physical interface of a third device, in a mode noted a MAC-to-PHY mode,
   an Ethernet medium Access Control module, noted MAC module, connected to said MAC MII interface, for performing functions of an Ethernet MAC layer, for communicating either with a second MAC module of said second device in said MAC-to-MAC mode, or with an Ethernet physical module of said third device in said MAC-to-PHY mode; and
   a back pressure module connected to said MAC MII interface and said MAC module, for performing, in half-duplex mode, either back pressure functions of an Ethernet physical layer towards said second MAC module in said MAC-to-MAC mode or back pressure functions of an Ethernet MAC layer towards said physical module in said MAC-to-PHY mode.

2. Device according to claim 1, wherein said MAC module comprises means for indicating a busy medium duration to said second MAC module.

3. Device according to claim 1, wherein said MAC module comprises means for receiving data from said second MAC module up to a maximum data rate, and means for sending a busy medium signal to said second MAC module on a reception of data at a data rate higher than the maximum data rate.

4. Device according to claim 2, wherein said MAC module comprises means for sending data to said second MAC module during said duration.

5. Device according to claim 1, wherein said busy medium signal is a carrier sense signal.

6. Integrated circuit wherein it comprises a device according to claim 1.

7. Device according to claim 1, said back pressure functions comprising sending medium busy signal either to said second MAC module in a MAC-to-MAC mode or to said physical module in a MAC-to-PHY mode.

* * * * *